US012662606B2

(12) United States Patent
Discekici et al.

(10) Patent No.: US 12,662,606 B2
(45) Date of Patent: Jun. 23, 2026

(54) THREE-DIMENSIONAL PRINTING WITH FOOD CONTACT COMPLIANT AGENTS

(71) Applicant: PERIDOT PRINT LLC, Palo Alto, CA (US)

(72) Inventors: Emre Hiro Discekici, San Diego, CA (US); Graciela E Negri Jimenez, San Diego, CA (US); Thomas M Sabo, San Diego, CA (US); Jason Butler, San Diego, CA (US)

(73) Assignee: Peridot Print LLC, Palo Alto, CA (US)

( * ) Notice: Subject to any disclaimer, the term of this patent is extended or adjusted under 35 U.S.C. 154(b) by 315 days.

(21) Appl. No.: 17/998,608

(22) PCT Filed: Oct. 15, 2020

(86) PCT No.: PCT/US2020/055667
§ 371 (c)(1),
(2) Date: Nov. 11, 2022

(87) PCT Pub. No.: WO2021/236146
PCT Pub. Date: Nov. 25, 2021

(65) Prior Publication Data
US 2023/0227671 A1 Jul. 20, 2023

(30) Foreign Application Priority Data

May 22, 2020 (WO) ................ PCT/US2020/034333
Jul. 10, 2020 (WO) ................ PCT/US2020/041622

(51) Int. Cl.
*C09D 171/02* (2006.01)
*B33Y 70/00* (2020.01)
(Continued)

(52) U.S. Cl.
CPC ............ *C09D 171/02* (2013.01); *B33Y 70/00* (2014.12); *C09D 7/20* (2018.01); *C09D 7/45* (2018.01);
(Continued)

(58) Field of Classification Search
CPC .......... C09D 171/02; C09D 7/61; C09D 7/20; C09D 7/45; C09D 7/63; B33Y 70/00;
(Continued)

(56) References Cited

U.S. PATENT DOCUMENTS 5,393,461 A 2/1995 Fillipova
5,957,380 A 9/1999 Fitterman et al.
(Continued)

FOREIGN PATENT DOCUMENTS

CN 105985052 A 10/2016
CN 110177638 A 8/2019
(Continued)

OTHER PUBLICATIONS

Commission Regulation (EuU) No. Oct. 2011 of Jan. 14, 2011 on plastic materials and articles intended to come into contact with food, Official Journal of the European Union, Jan. 15, 2011, 89 pages.

*Primary Examiner* — Coris Fung
*Assistant Examiner* — Catriona M Corallo
(74) *Attorney, Agent, or Firm* — Dierker & Kavanaugh, P.C.

(57) ABSTRACT

The present disclosure is drawn to food contact compliant three-dimensional printing kits, materials, compositions, systems, and methods. In one example, a multi-fluid kit of food contact compliant agents for three-dimensional printing can include a food contact compliant fusing agent and a food contact compliant detailing agent. The food contact compliant fusing agent can include from about 70 wt % to
(Continued)

about 96 wt % water, from about 3 wt % to about 10 wt % by solids weight of a food contact compliant carbon black dispersion, and from about 1 wt % to about 25 wt % of a food contact compliant water-soluble first co-solvent. The food contact compliant detailing agent can include from about 75 wt % to about 99 wt % water and from about 0.01 wt % to about 1 wt % of a food contact compliant chelating compound.

11 Claims, 3 Drawing Sheets

(51) Int. Cl.

| | |
|---|---|
| *C09D 7/20* | (2018.01) |
| *C09D 7/45* | (2018.01) |
| *C09D 7/61* | (2018.01) |
| *C09D 7/63* | (2018.01) |
| *B29C 64/165* | (2017.01) |
| *B29K 71/00* | (2006.01) |
| *B33Y 30/00* | (2015.01) |
| *C08K 3/04* | (2006.01) |
| *C08K 5/13* | (2006.01) |
| *C08K 5/17* | (2006.01) |
| *C08K 5/42* | (2006.01) |

(52) U.S. Cl.
CPC ................ *C09D 7/61* (2018.01); *C09D 7/63* (2018.01); *B29C 64/165* (2017.08); *B29K 2071/02* (2013.01); *B33Y 30/00* (2014.12); *C08K 3/04* (2013.01); *C08K 5/13* (2013.01); *C08K 5/175* (2013.01); *C08K 5/42* (2013.01)

(58) Field of Classification Search
CPC ... B33Y 30/00; B29C 64/165; B29K 2071/02; C08K 3/04; C08K 5/13; C08K 5/175; C08K 5/42
USPC .................................................... 106/287.23
See application file for complete search history.

(56) References Cited

U.S. PATENT DOCUMENTS

| | | | |
|---|---|---|---|
| 9,133,344 | B2 | 9/2015 | Ganapathiappan et al. |
| 9,856,390 | B2 | 1/2018 | Bredt et al. |
| 2002/0119236 | A1 | 8/2002 | Yokoo et al. |
| 2005/0101684 | A1 | 5/2005 | You et al. |
| 2006/0012051 | A1 | 1/2006 | Sato et al. |
| 2011/0177138 | A1 | 7/2011 | Herry et al. |
| 2013/0035456 | A1 | 2/2013 | Zhu et al. |
| 2016/0160021 | A1 | 6/2016 | Kojima et al. |
| 2017/0106591 | A1 | 4/2017 | Tabayashi |
| 2017/0145155 | A1* | 5/2017 | Wright ................. C08G 63/672 |
| 2017/0246807 | A1 | 8/2017 | Emamjomeh et al. |
| 2017/0247552 | A1 | 8/2017 | Prasad et al. |
| 2018/0015665 | A1 | 1/2018 | Kosugi et al. |
| 2018/0192686 | A1 | 7/2018 | Shoseyov et al. |
| 2018/0264753 | A1 | 9/2018 | Kornilovich et al. |
| 2018/0333914 | A1 | 11/2018 | Rudisill et al. |
| 2019/0030799 | A1 | 1/2019 | Chen et al. |
| 2019/0039296 | A1* | 2/2019 | Prasad ....................... C09C 1/48 |
| 2019/0047216 | A1 | 2/2019 | Emamjomeh et al. |
| 2019/0091400 | A1 | 3/2019 | Everhart |
| 2019/0105842 | A1 | 4/2019 | Dau et al. |
| 2019/0328988 | A1 | 10/2019 | Weiss et al. |
| 2019/0343769 | A1 | 11/2019 | Kasperchik et al. |
| 2020/0115574 | A1 | 4/2020 | Querol Esparch et al. |
| 2021/0214570 | A1 | 7/2021 | Prasad et al. |
| 2023/0173756 | A1 | 6/2023 | Kasperchik et al. |
| 2023/0203337 | A1 | 6/2023 | Discekici et al. |
| 2023/0203338 | A1 | 6/2023 | Discekici et al. |

FOREIGN PATENT DOCUMENTS

| | | | | |
|---|---|---|---|---|
| CN | 110872466 | A | 3/2020 | |
| WO | 2017/172937 | A1 | 10/2017 | |
| WO | 2017/188965 | A1 | 11/2017 | |
| WO | 2017/188966 | A1 | 11/2017 | |
| WO | 2018/222108 | A1 | 12/2018 | |
| WO | WO-2019013752 | A1 * | 1/2019 | ............. B29C 64/10 |
| WO | WO-2019147266 | A1 * | 8/2019 | ........... B29C 64/165 |
| WO | 2019/172937 | A1 | 9/2019 | |
| WO | 2019/182579 | A1 | 9/2019 | |
| WO | 2019/199328 | A1 | 10/2019 | |
| WO | 2019/245535 | A1 | 12/2019 | |
| WO | 2020/081094 | A1 | 4/2020 | |

* cited by examiner

THREE-DIMENSIONAL PRINTING WITH FOOD CONTACT COMPLIANT AGENTS

BACKGROUND

Methods of three-dimensional (3D) digital printing, a type of additive manufacturing, have continued to be developed over the last few decades. However, systems for three-dimensional printing have historically been very expensive, though those expenses have been coming down to more affordable levels recently. Three-dimensional printing technology can shorten the product development cycle by allowing rapid creation of prototype models for reviewing and testing. In some respects, three-dimensional printing has been somewhat limited with respect to commercial production capabilities because the range of materials used in three-dimensional printing is likewise limited. Nevertheless, several commercial sectors such as aviation and the medical industry have benefited from the ability to rapidly prototype and customize parts for customers.

Figure 1:
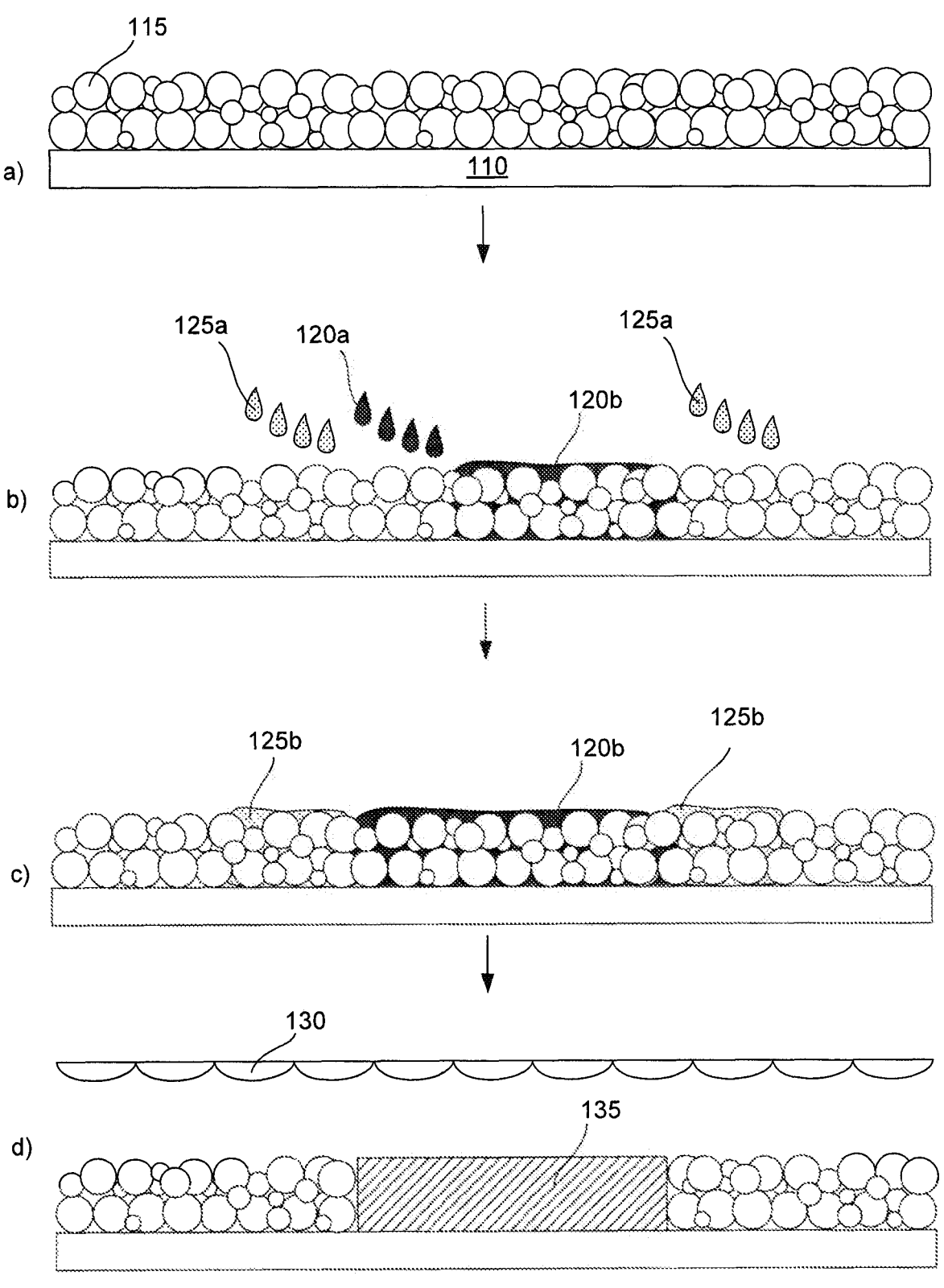
FIG. 1 is a close-up side cross-sectional view of a layer of thermoplastic polymer powder, a fusing agent, and a detailing agent in accordance with examples of the present disclosure.

The figures depict examples of the presently disclosed technology. However, it should be understood that the present technology is not limited to the examples depicted.

DETAILED DESCRIPTION

The present disclosure describes food contact compliant materials for three-dimensional printing. In one example, a multi-fluid kit of food contact compliant agents for three-dimensional printing includes a food contact compliant fusing agent. The fusing agent includes from about 70 wt % to about 96 wt % water based on the total weight of the food contact compliant fusing agent; food contact compliant carbon black dispersion in an amount of from about 3 wt % to about 10 wt % by solids weight of the carbon black dispersion out of the total weight of the food contact compliant fusing agent; and a food contact compliant water-soluble first co-solvent present in the food contact compliant fusing agent in an amount of from about 1 wt % to about 25 wt % based on the total weight of the food contact compliant fusing agent. The multi-fluid kit also includes a food contact compliant detailing agent. The detailing agent includes from about 75 wt % to about 99 wt % water based on the total weight of the food contact compliant detailing agent; and a food contact compliant chelating compound in an amount of from about 0.01 wt % to about 1 wt % based on the total weight of the food contact compliant detailing agent. In further examples, the food contact compliant water-soluble first co-solvent can include glycerol and polyethylene glycol, and the food contact compliant detailing agent can also include a food contact compliant water-soluble second co-solvent in an amount of from about 2 wt % to about 24 wt % based on the total weight of the food contact compliant detailing agent. The food contact compliant water-soluble second co-solvent can include glycerol and propylene glycol. In other examples, the food contact compliant fusing agent and the food contact compliant detailing agent can include 2-phenoxyethanol in an amount from about 0.2 wt % to about 1 wt % based on the total weight of the respective agents. In some examples, the food contact compliant fusing agent can also include a food contact compliant surfactant. In certain examples, the food contact compliant surfactant is dioctyl sulfosuccinate sodium salt and the food contact compliant fusing agent may not include sodium dodecyl sulfate. In other examples, the food contact compliant detailing agent can include from about 75 wt % to about 80 wt % water based on the total weight of the food contact compliant detailing agent. In certain examples, the food contact compliant chelating compound can be disodium ethylenediaminetetraacetate dihydrate.

The present disclosure also describes three-dimensional printing kits. In one example, a three-dimensional printing kit includes a food contact compliant fusing agent, a food contact compliant detailing agent, and a thermoplastic polymer powder. The food contact compliant fusing agent includes from about 70 wt % to about 96 wt % water based on the total weight of the food contact compliant fusing agent; a food contact compliant carbon black dispersion in an amount of from about 3 wt % to about 10 wt % by solids weight of the carbon black dispersion out of the total weight of the food contact compliant fusing agent; and a food contact compliant water-soluble first co-solvent present in the food contact compliant fusing agent in an amount of from about 1 wt % to about 25 wt % based on the total weight of the food contact compliant fusing agent. The food contact compliant detailing agent includes from about 75 wt % to about 99 wt % water based on the total weight of the food contact compliant detailing agent; and a food contact compliant chelating compound in an amount of from about 0.01 wt % to about 1 wt % based on the total weight of the food contact compliant detailing agent. In some examples, the thermoplastic polymer powder can include polyamide-6 powder, polyamide-9 powder, polyamide-11 powder, polyamide-12 powder, polyamide-66 powder, polyamide-612 powder, polyethylene powder, thermoplastic polyurethane powder, thermoplastic polyamide powder, polypropylene powder, polyester powder, polycarbonate powder, polyether ketone powder, polyacrylate powder, polystyrene powder, polyvinylidene fluoride powder, or a combination thereof. In certain examples, the thermoplastic polymer powder can have an average particle size from about 10 microns to about 200 microns. In other examples, the food contact compliant fusing agent can also include dioctyl sulfosuccinate sodium salt and may not include sodium dodecyl sulfate. In further examples, the food contact compliant detailing agent can include from about 75 wt % to about 80 wt % water based on the total weight of the food contact compliant detailing agent. The food contact compliant chelating compound can be disodium ethylenediaminetetraacetate dihydrate. The food contact compliant detailing agent can also include a food contact compliant water-soluble second co-solvent in an amount of from about 2 wt % to about 24 wt % based on the total weight of the food contact compliant detailing agent.

The present disclosure also describes three-dimensional printing systems. In one example, a three-dimensional printing system includes a powder bed including a thermoplastic polymer powder, a fluid jet printer, and a fusing radiation source. The fluid jet printer includes a first fluid ejector in communication with a reservoir of a food contact compliant fusing agent to print the food contact compliant fusing agent onto the powder bed. The food contact compliant fusing agent includes: about 70 wt % to about 96 wt % water based on the total weight of the food contact compliant fusing agent; a food contact compliant carbon black dispersion in an amount of from about 3 wt % to about 10 wt % based on the total weight of the food contact compliant fusing agent; and a food contact compliant water-soluble first co-solvent present in the food contact compliant fusing agent in an amount of from about 1 wt % to about 25 wt % based on the total weight of the food contact compliant fusing agent. The fluid jet printer also includes a second fluid ejector in communication with a reservoir of a food contact compliant detailing agent to print the food contact compliant detailing agent onto the powder bed. The food contact compliant detailing agent includes: from about 75 wt % to about 99 wt % water based on the total weight of the food contact compliant detailing agent and a food contact compliant chelating compound in an amount of from about 0.01 wt % to about 1 wt % based on the total weight of the food contact compliant detailing agent. The fusing radiation source exposes the powder bed to electromagnetic radiation sufficient to fuse thermoplastic polymer powder that has been printed with the food contact compliant fusing agent. In some examples, the food contact compliant fusing agent can also include dioctyl sulfosuccinate sodium salt and the food contact compliant fusing agent may not include sodium dodecyl sulfate. In further examples, the food contact compliant detailing agent can include from about 75 wt % to about 80 wt % water based on the total weight of the food contact compliant detailing agent. The food contact compliant chelating compound can be disodium ethylenediaminetetraacetate dihydrate. The food contact compliant detailing agent can also include a food contact compliant water-soluble second co-solvent in an amount of from about 2 wt % to about 24 wt % based on the total weight of the food contact compliant detailing agent.

The multi-fluid kits, three-dimensional printing kits, and systems described herein can be used to print three-dimensional objects that can be sold in regulated markets such as the food contact compliant market. In an example of a three-dimensional printing process that can be performed with these materials, a thin layer of thermoplastic polymer powder is spread on a bed to form a powder bed. A printing head, such as a fluid jet print head, is then used to print a fusing agent and/or detailing agent over portions of the powder bed. The bed is exposed to a light source, e.g., typically the entire bed. The fusing agent absorbs more energy from the light than the unprinted powder. The absorbed light energy is converted to thermal energy, causing the printed portions of the powder to melt and coalesce. This forms a solid layer. After the first layer is formed, a new thin layer of polymer powder is spread over the powder bed and the process is repeated to form additional layers until a complete three-dimensional part is printed. Such three-dimensional printing processes can achieve fast throughput with good accuracy.

In some examples of the presently disclosed technology, the food contact compliant fusing agent and the food contact compliant detailing agent can be jettable, that is, formulated for use in a fluid jet printer such as a thermal inkjet printer. Fluid jet printing technology can be used to print food contact compliant fusing agent and/or food contact compliant detailing agent onto the powder bed with high speed and high resolution. The food contact compliant fusing agent and the food contact compliant detailing agent can be formulated to have suitable printing reliability, which can be related to the viscosity of the fusing agent and the detailing agent. In further examples, the food contact compliant fusing agent and the food contact compliant detailing agent can be formulated to provide a long resistor life for the resistors in a thermal fluid jet printing system. Accordingly, the materials described herein can, in some examples, be used to make food contact compliant three-dimensional printed objects and the fluid agents can be jettable without deleterious effects on nozzle health or shelf-life stability of the fluid agents.

As mentioned above, the multi-fluid kits, three-dimensional printing kits, and systems described herein can include a food contact compliant fusing agent. In some examples, the food contact compliant fusing agent can include from about 70 wt % to about 96 wt % water, a food contact compliant carbon black dispersion in an amount of from about 3 wt % to about 10 wt % by solids weight of the carbon black dispersion out of the total weight of the food contact compliant fusing agent, and a food contact compliant water-soluble co-solvent present in an amount of from about 1 wt % to about 25 wt % based on the total weight of the food contact compliant fusing agent. Specific examples of these ingredients are described in more detail below. In further examples, the food contact compliant fusing agent can also include additional ingredients. Some such additional ingredients can include a food contact compliant pH adjuster, a food contact compliant liquid additive, and a food contact compliant surfactant.

In some examples, the food contact compliant pH adjuster can include taurine, glycine, sodium bicarbonate, sodium dihydrogen orthophosphate, mono-sodium phosphate, disodium phosphate, tribasic-sodium phosphate, or mixtures thereof. In certain examples, the food contact compliant fusing agent can include taurine as a pH adjuster. In alternative examples, the food contact compliant fusing agent can be devoid of pH adjusters. In particular examples, the food contact compliant fusing agent can be devoid of any of the example pH adjusters described above. In another particular example, the food contact compliant fusing agent can be devoid of taurine.

In some examples, the food contact compliant liquid additive is 2-phenoxyethanol, 2-phenylethanol, potassium sorbate, sodium benzoate, methylparaben, propylparaben, or mixtures thereof. In certain examples, the food contact compliant fusing agent can include 2-phenoxyethanol as a liquid additive.

In a specific example, the food contact compliant fusing agent can include a food contact compliant liquid additive in an amount from about 0.2 wt % to about 2 wt %. In other examples, the food contact compliant fusing agent can include the food contact compliant liquid additive in an amount from about 0.8 wt % to about 1.5 wt %. In various examples, the liquid additive may not be a "liquid" on its own, but can be an additive that is included in the liquid agents described herein. For example, the liquid additive can include a solid that is soluble in the food contact compliant fusing agent.

The food contact compliant surfactant included in the food contact compliant fusing agent can include sodium dodecyl sulfate, dioctyl sulfosuccinate sodium salt, polyoxyethylene sorbitan monolaurate, isothionic acid sodium salt, sodium cocoyl isethionate, silicone surfactants, nonionic surfactants, anionic surfactants, cationic surfactants, or combinations thereof. In some examples, a food contact compliant surfactant can be included in the food contact compliant fusing agent in an amount of from about 0.05 wt % to about 0.5 wt %. In further examples, the surfactant can be included in an amount of from about 0.1 wt % to about 0.2 wt %. In a particular example, the food contact compliant surfactant can include dioctyl sulfosuccinate sodium salt. In a further example, the food contact compliant fusing agent can be devoid of sodium dodecyl sulfate.

A food contact compliant detailing agent can also be included in the multi-fluid kits and three-dimensional printing kits described herein. In some examples, a food contact compliant detailing agent can include: from about 75 wt % to about 99 wt % water and a food contact compliant chelating compound in an amount of from about 0.01 wt % to about 1 wt % based on the total weight of the food contact compliant detailing agent. The detailing agent can also include additional ingredients, such as a food contact compliant pH adjuster, a food contact compliant liquid additive, a food contact compliant surfactant, and a food contact compliant chelating compound.

In some examples, the food contact compliant pH adjuster included in the food contact compliant detailing agent can include taurine, glycine, sodium bicarbonate, sodium dihydrogen orthophosphate, mono-sodium phosphate, di-sodium phosphate, tribasic-sodium phosphate, or mixtures thereof. In certain examples, the food contact compliant detailing agent can include sodium bicarbonate as a pH adjuster. In further examples, the food contact compliant detailing agent can include a pH adjuster in an amount of from about 0.01 wt % to about 1 wt % with respect to the total weight of the food contact compliant detailing agent.

In some examples, the food contact compliant liquid additive included in the food contact compliant detailing agent can include 2-phenoxyethanol, 2-phenylethanol, potassium sorbate, sodium benzoate, methylparaben, propylparaben, or mixtures thereof. In certain examples, the food contact compliant detailing agent can include 2-phenoxyethanol as a liquid additive. In a specific example, the food contact compliant detailing agent can include a food contact compliant liquid additive in an amount from about 0.2 wt % to about 2 wt %. In other examples, the food contact compliant detailing agent can include the food contact compliant liquid additive in an amount from about 0.8 wt % to about 1.5 wt %.

The food contact compliant surfactant included in the food contact compliant detailing agent can include sodium dodecyl sulfate, dioctyl sulfosuccinate sodium salt, polyoxyethylene sorbitan monolaurate, isothionic acid sodium salt, sodium cocoyl isethionate, silicone surfactants, nonionic surfactants, anionic surfactants, cationic surfactants, or combinations thereof. In some examples, a food contact compliant surfactant can be included in the food contact compliant detailing agent in an amount of from about 0.05 wt % to about 0.5 wt %. In further examples, the surfactant can be included in an amount of from about 0.1 wt % to about 0.2 wt %. In a particular example, the food contact compliant surfactant can include dioctyl sulfosuccinate sodium salt.

The food contact compliant detailing agent can also include a food contact compliant chelating compound. In some examples, the food contact compliant chelating compound can include disodium ethylenediaminetetraacetate dihydrate, tetrasodium ethylenediaminetetraacetate salt, calcium disodium ethylenediaminetetraacetate, free acid ethylenediaminetetraacetic acid, citric acid, sodium citrate, potassium citrate, polyphosphates such as disodiumpyrophosphate, or a combination thereof. In a particular example, the food contact compliant chelating compound can be disodium ethylenediaminetetraacetate dihydrate. In further examples, the food contact compliant detailing agent can include the food contact compliant chelating compound in an amount from about 0.01 wt % to about 1 wt %.

In some examples, the food contact compliant fusing agent and the food contact compliant detailing agent described herein can be jetted onto a bed of thermoplastic polymer powder. In certain examples, the thermoplastic polymer powder can include polyamide-6 powder, polyamide-9 powder, polyamide-11 powder, polyamide-12 powder, polyamide-66 powder, polyamide-612 powder, polyethylene powder, thermoplastic polyurethane powder, thermoplastic polyamide powder, polypropylene powder, polyester powder, polycarbonate powder, polyether ketone powder, polyacrylate powder, polystyrene powder, polyvinylidene fluoride powder, or a combination thereof.

The food contact compliant fusing agent and the detailing agent described above can also be included in a three-dimensional printing kit. In some examples, the three-dimensional printing kit can include a food contact compliant fusing agent, a food contact compliant detailing agent, and a thermoplastic polymer powder. The food contact compliant fusing agent can include: from about 70 wt % to about 96 wt % water based on the total weight of the food contact compliant fusing agent, food contact compliant carbon black dispersion in an amount of from about 3 wt % to about 10 wt % by solids weight of the carbon black dispersion out of the total weight of the food contact compliant fusing agent, and a food contact compliant water-soluble first co-solvent present in the food contact compliant fusing agent in an amount of from about 1 wt % to about 25 wt % based on the total weight of the food contact compliant fusing agent. The food contact compliant detailing agent can include: from about 75 wt % to about 99 wt % water based on the total weight of the food contact compliant detailing agent, and a food contact compliant chelating compound in an amount of from about 0.01 wt % to about 1 wt % based on the total weight of the food contact compliant detailing agent.

In some examples, the thermoplastic polymer powder used in the three-dimensional printing kits can include polyamide-6 powder, polyamide-9 powder, polyamide-11 powder, polyamide-12 powder, polyamide-66 powder, polyamide-612 powder, polyethylene powder, thermoplastic polyurethane powder, thermoplastic polyamide powder, polypropylene powder, polyester powder, polycarbonate powder, polyether ketone powder, polyacrylate powder, polystyrene powder, polyvinylidene fluoride powder, or a combination thereof. In some examples, the thermoplastic polymer powder can have an average particle size from about 10 microns to about 200 microns.

The present disclosure also describes three-dimensional printing systems. The systems can include a powder bed that includes the thermoplastic polymer powder described above. The system can also include a fluid jet printer that includes a first fluid ejector in communication with a reservoir of a food contact compliant fusing agent as described above. The fluid jet printer can also include a second fluid ejector in communication with a reservoir of a food contact compliant detailing agent as described above. The system can also include a fusing radiation source to expose the powder bed to electromagnetic radiation sufficient to fuse thermoplastic polymer powder that has been printed with the food contact compliant fusing agent.

Food Contact Compliant Fusing Agent Examples

In addition to properties of the fusing agent that allow the fusing agent to be printed using fluid jet technology, the fusing agent can also be formulated to (i) be food contact compliant and (ii) provide good fusing of the thermoplastic polymer powder in the three-dimensional printing process described above. Thus, the fusing agent can include a food contact compliant energy absorber to absorb electromagnetic energy to generate sufficient heat to fuse the thermoplastic polymer powder. In some examples, the energy absorber can include a food contact compliant carbon-based pigment, such as a food contact compliant carbon black pigment. Food contact compliant carbon black pigments can effectively absorb electromagnetic radiation across a wide range of wavelengths while still usable for regulated applications such as food contact compliant materials (e.g., food packaging), cosmetic contact materials (e.g., cosmetic packaging or products such as mascara wands), and other regulated consumer applications. Therefore, food contact compliant carbon black pigments can effectively raise the temperature of the thermoplastic polymer powder onto which they may be printed.

Balancing all of the above properties to produce a food contact compliant fusing agent with good jetting properties as well as good fusing properties can be challenging. However, certain formulations can provide food contact compliant fusing agents that function well as food contact compliant fusing agents in the three-dimensional printing processes described herein, while also providing good jetting properties.

With this description in mind, some examples of the presently disclosed technology involve three-dimensional printing kits, multi-fluid kits, and/or compositions including a food contact compliant fusing agent and/or a food contact compliant detailing agent. The food contact compliant fusing agent and food contact compliant detailing agent can be formulated for fluid jet printing. In additional examples, the presently disclosed technology can encompass kits made up of a food contact compliant fusing agent and a food contact compliant detailing agent in combination with a thermoplastic polymer powder. As explained above, the food contact compliant fusing agent can be printed onto portions of a thermoplastic polymer powder bed and the bed can be irradiated with electromagnetic radiation to fuse the printed portions. This forms a single layer of the three-dimensional part being printed. The food contact compliant detailing agent can be printed in areas at or near the edges of the portions that may be printed with the fusing agent. The food contact compliant detailing agent can have the effect of cooling the polymer powder around the edges of the portions printed with the food contact compliant fusing agent. Thus, when the portions printed with the food contact compliant fusing agent may be fused by irradiation with electromagnetic energy, the polymer powder around the edges can remain at a lower temperature. This can prevent fusing of the polymer powder surrounding the edges of the fused layer, increasing selectivity between the fused portions and the unfused portions of the powder bed.

Three-Dimensional Printing Kit Examples and Three-Dimensional Printing Method Examples Examples of the kits and compositions described above are shown in more detail in FIG. 1. With specific reference to FIG. 1, a) shows a build platform or movable floor 110 of a three-dimensional printing system, to which is deposited a thin layer of thermoplastic polymer powder 115 to form a powder bed. Next, b) shows droplets of a fusing agent 120a as well as already deposited food contact compliant fusing agent 120b applied to and within a portion of the powder bed. Droplets of a food contact compliant detailing agent 125a may be applied to portions of the powder bed adjacent to the edges of the portion printed with the food contact compliant fusing agent. The food contact compliant fusing agent 120b and food contact compliant detailing agent 125b applied to the powder bed admix and fill voids within the powder, as shown in c). The portion of the powder bed printed with the food contact compliant fusing agent is then fused using a curing lamp 130 to form a fused part layer 135. In some cases the food contact compliant detailing agent can substantially evaporate off of the powder bed, leaving unfused thermoplastic polymer powder around the edge of the fused part layer. The build platform or moveable floor can then be lowered and the process can be repeated with additional layers of thermoplastic polymer powder to form additional fused layers of the three-dimensional printed part.

It should be noted that the fused part layer 135 shown in FIG. 1 is an idealized depiction of the fused layers formed in practice. In some cases, fused layers formed using the processes described herein do not have a perfect rectangular cross section as shown in FIG. 1, because edges of the fused layers can often include partially fused polymer particles embedded into the fused layers. This can result in a surface that is uneven or bumpy at the scale of the individual particles. However, in some examples the thermoplastic polymer powder particles can be small enough that the parts printed therefrom still have a smooth appearance when viewed by the human eye.

In some cases, partially fused particles at the edges of the three-dimensional printed part can result in an appearance of uneven coloration of the part. As mentioned above, in some examples the food contact compliant fusing agent can include a food contact compliant carbon black pigment as an energy absorber. Such pigments can produce a dark black color in the three-dimensional printed part. In some examples, the thermoplastic polymer powder can naturally have a light, white, or translucent color. Thus, when particles of the thermoplastic polymer powder that have not been printed with the carbon black pigment become embedded at the surface of the three-dimensional printed part, the unprinted particles do not have the same black color. This can result in an uneven grayish appearance at the surfaces of the three-dimensional printed part.

Figure 2:
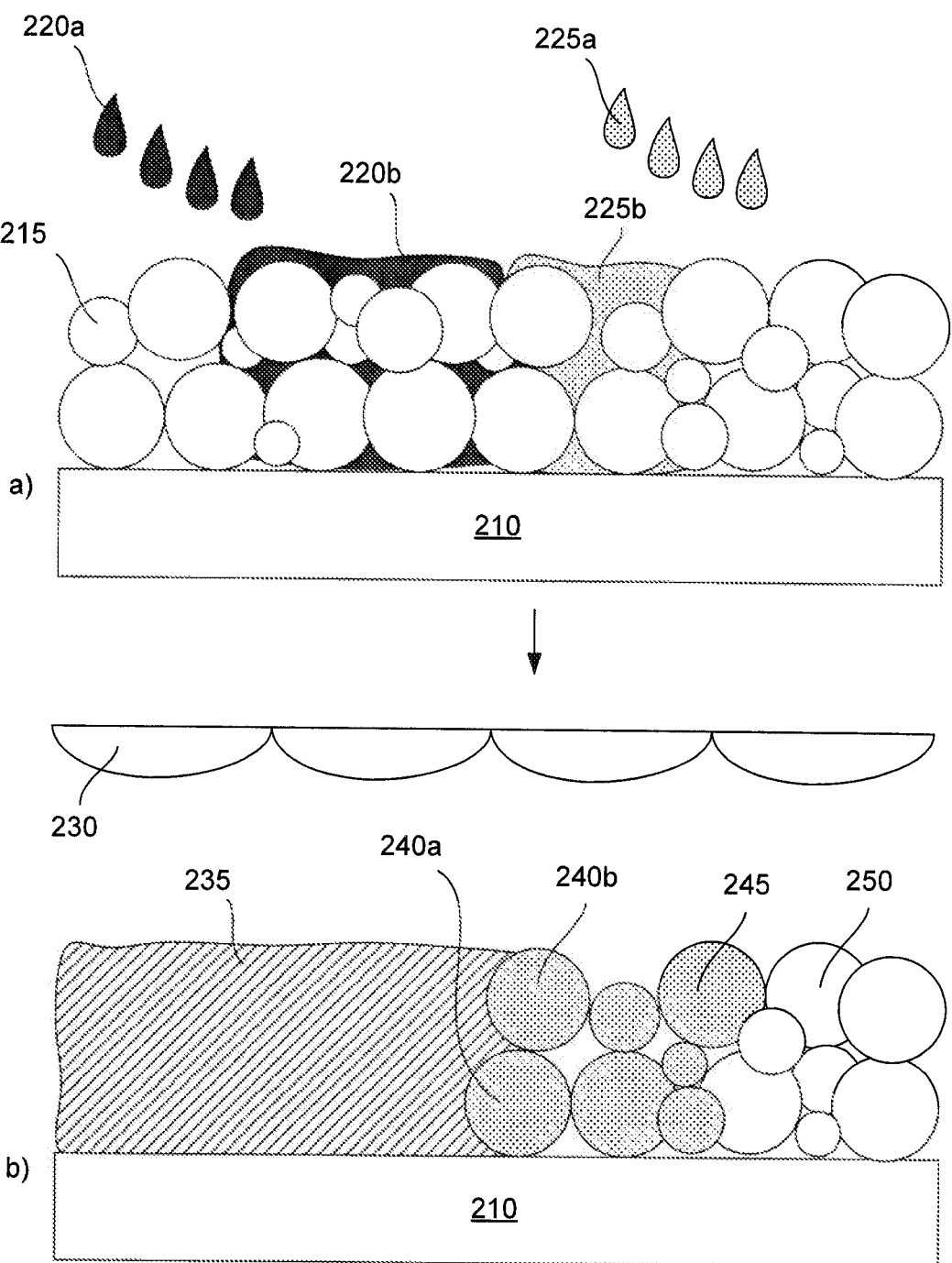
FIG. 2 is a close-up side cross-sectional view of a layer of thermoplastic polymer powder, a fusing agent, and a detailing agent in accordance with examples of the present disclosure.

The use of such a food contact compliant detailing agent with a food contact compliant fusing agent and a thermoplastic polymer powder is shown in more detail in FIG. 2. Referring specifically to FIG. 2, a) shows a build platform or moveable floor 210 with a thin layer of thermoplastic polymer powder 215 spread thereon to form a powder bed. Droplets of a food contact compliant fusing agent 220a and deposited food contact compliant fusing agent 220b are shown in a portion of the powder bed that is to be fused. Droplets of a food contact compliant detailing agent 225a and deposited food contact compliant detailing agent 225b are also shown at an edge of the portion to be fused. After curing with a curing lamp 230, the portion printed with the food contact compliant fusing agent fuses to form a fused part layer 235. Embedded particles 240a, 240b at the edge of the fused part layer can have a black color due to food contact compliant black dye in the detailing agent. Thus, the color of the embedded particles can match the black color of the fused part layer. Additional loose particles 245 that can be printed with the food contact compliant detailing agent can also have a black color. Unprinted particles 250 outside the portions printed with the food contact compliant detailing agent can retain their original color.

In a particular example of the presently described technology, a kit or composition can include a food contact compliant fusing agent and a food contact compliant detailing agent. The food contact compliant fusing agent can include water, a food contact compliant carbon black pigment, and a water soluble co-solvent present in the food contact compliant fusing agent at an amount from about 1 wt % to about 25 wt %. In some examples, the food contact compliant detailing agent can include water and a food contact compliant black dye.

Food Contact Compliant Carbon Black Dispersion Examples

In some examples, the food contact compliant carbon black pigment can be in the form of a dispersion of food contact compliant carbon black pigment particles. The dispersion stability and particle size of the carbon black pigment dispersion can affect the jettability of the fusing agent. As used herein, "dispersion stability" refers to the ability of the food contact compliant carbon black pigment particles to remain dispersed without aggregating to form large aggregate particles that interfere with jetting. Dispersion stability can be measured in various ways. In one example, dispersion stability can be stated as a measurement of average pigment particle size over time. Food contact compliant pigments with a high dispersion stability can have an average particle size that remains stable over time, while food contact compliant pigments with a low dispersion stability can show increased particle size over time. In another example, dispersion stability can be measured by counting the number of particles with a particle size over a certain threshold particle size for a period of time. Food contact compliant pigments with low dispersion stability will show an increase in the number of large particles over time. When food contact compliant pigment particles aggregate to form larger aggregate particles, the viscosity of the fusing agent can also increase. Therefore, the dispersion stability can also be measured by measuring viscosity of the food contact compliant fusing agent over time.

In some examples, the carbon black dispersion can have a composition as shown in Table 1 below.

TABLE 1

| Component | wt % |
| --- | --- |
| Carbon black | 10-20 |
| Organic solvent | 15-20 |
| Binder Resin | 3-10 |
| Water | balance |

In certain examples, the food contact compliant carbon black pigment can have an average primary particle size from 2 nm to 50 nm. Additionally, the food contact compliant carbon black pigment can have an average aggregate particle size from 60 nm to 200 nm.

In further examples, the food contact compliant carbon black pigment can be dispersed by a dispersant. In certain examples, the dispersant can include a polymeric dispersant. Non-limiting examples of polymeric dispersants can include styrenes, maleic anhydrides, acrylics, or copolymers thereof. In particular examples, the dispersant can include a styrene acrylic copolymer such as JONCRYL® styrene acrylic resins available from BASF (Germany). Small molecule dipsersing agents can also be used. In further examples, the carbon black pigment can be in the form of a pigment dispersion such as a CAB-O-JET® carbon black pigment dispersion available from Cabot (USA).

In some examples, the food contact compliant carbon black dispersion includes from about 10 wt % to about 20 wt % food contact compliant carbon black particles based on the total weight of the carbon black dispersion, or the food contact compliant carbon black dispersion includes from about 12 wt % to about 18 wt % food contact compliant carbon black particles based on the total weight of the carbon black dispersion, or the food contact compliant carbon black dispersion includes from about 14 wt % to about 16 wt % food contact compliant carbon black particles based on the total weight of the carbon black dispersion. In some examples, the food contact compliant carbon black dispersion is present in an amount of from about 4 wt % to about 7 wt % based on the total weight of the food contact compliant fusing agent, or the food contact compliant carbon black dispersion is present in an amount of from about 5 wt % to about 6 wt % based on the total weight of the food contact compliant fusing agent.

In some examples, the food contact compliant polymeric dispersant is used in an amount of from about 0.5 wt % to about 5 wt % based on the total weight of the food contact compliant fusing agent and/or food contact compliant detailing agent.

Food Contact Energy Absorber Examples/Dye Examples/Pigment Examples

In some examples, the food contact compliant carbon black dispersion is present in an amount of from about 3 wt % to about 10 wt % based on the total weight of the fusing agent. In some examples, the food contact compliant carbon black dispersion is present in an amount of from about 4 wt % to about 7 wt % based on the total weight of the fusing agent.

In some examples, the food contact compliant carbon black dispersion includes from about 10 wt % to about 20 wt % carbon black particles based on the total weight of the carbon black dispersion. In some examples, the food contact compliant carbon black dispersion includes from about 12 wt % to about 18 wt % carbon black particles based on the total weight of the carbon black dispersion. In some examples, the food contact compliant carbon black dispersion includes from about 14 wt % to about 16 wt % carbon black particles based on the total weight of the carbon black dispersion.

In further examples, the food contact compliant fusing agent can include additional energy absorbers. Similar to the food contact compliant carbon black pigment, these additional energy absorbers can also effectively absorb electromagnetic radiation to produce heat. Examples of other food contact compliant energy absorbers can include food contact compliant near-infrared absorbing dyes, food contact compliant near-infrared absorbing pigments, food contact compliant tungsten bronzes, food contact compliant molybdenum bronzes, food contact compliant metal nanoparticles, food contact compliant conjugated polymers, or combinations thereof.

As mentioned, the food contact compliant energy absorbers can also include a conjugated polymer. As used herein, "conjugated" refers to alternating double and single bonds between atoms in a molecule. Thus, "conjugated polymer" refers to a polymer that has a backbone with alternating double and single bonds. In many cases, the food contact compliant energy absorbers can have a peak absorption wavelength in the range of 800 nm to 1400 nm.

Additional food contact compliant near-infrared pigments can include silicates. Food contact compliant silicates can have the same or similar counterions as phosphates. One non-limiting example can include food contact compliant $M_2SiO_4$, $M_2Si_2O_6$, and other silicates where M is a counterion having an oxidation state of +2. For example, the food contact compliant silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. It is noted that the food contact compliant silicates described herein are not limited to counterions having a +2 oxidation state. Other food contact compliant silicate counterions can also be used to prepare other suitable near-infrared pigments.

In some examples, the food contact compliant carbon black pigment and additional food contact compliant energy absorbers, if present, can be water-dispersible or water-soluble. Such food contact compliant energy absorbers can be used with an aqueous food contact compliant vehicle with or without a food contact compliant co-solvent.

Food Contact Compliant Co-solvent(s) Examples

The components of the food contact compliant fusing agent can be selected to give the food contact compliant fusing agent good fluid jetting performance and the ability to fuse the polymer bed material and/or color the polymer powder with good optical density. Thus, the food contact compliant fusing agent can include a food contact compliant liquid vehicle. In some examples, the food contact compliant liquid vehicle formulation can include a food contact compliant co-solvent present in an amount of from about 1 wt % to about 25 wt %, depending on the jetting architecture.

In some examples the food contact compliant fusing and/or detailing agents can be substantially free of organic solvent. However, in other examples a co-solvent can be used to help disperse other dyes or pigments, or adjust the jetting properties of the respective fluids. In still further examples, a non-aqueous vehicle can be used with an organic-soluble or organic-dispersible energy absorber.

In certain examples, a food contact compliant high boiling point co-solvent can be included in the various fluids. The food contact compliant high boiling point co-solvent can be an organic co-solvent that boils at a temperature higher than the temperature of the powder bed during printing. In some examples, the food contact compliant high boiling point co-solvent can have a boiling point above 250° C. In still further examples, the food contact compliant high boiling point co-solvent can be present in the various fluids at a concentration from about 1 wt % to about 4 wt %.

Classes of food contact compliant co-solvents that can be used can include food contact compliant organic co-solvents including aliphatic alcohols, diols, glycol ethers, polyglycol ethers, caprolactams, and long chain alcohols.

Examples of such compounds include food contact compliant primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, and the like. Specific examples of food contact compliant solvents that can be used include, but are not limited to food contact compliant propylene glycol, food contact compliant glycerol, food contact compliant polyethylene glycol, or combinations thereof.

In a particular example, the food contact compliant fusing agent can include propylene glycol, glycerol, polyethylene glycol, or combinations thereof, as co-solvents. In some examples, the food contact compliant co-solvent in the food contact compliant fusing agent can include food contact compliant propylene glycol, food contact compliant glycerol, food contact compliant polyethylene glycol, or combinations thereof, in an amount from about 1 wt % to about 25 wt % with respect to the total weight of the food contact compliant fusing agent, or in an amount from about 3 wt % to about 20 wt % with respect to the total weight of the food contact compliant fusing agent, or in an amount from about 5 wt % to about 15 wt % with respect to the total weight of the food contact compliant fusing agent, or in an amount from about 1 wt % to about 10 wt % with respect to the total weight of the food contact compliant fusing agent.

Food Contact Compliant Surfactant(s) Examples

Regarding the food contact compliant surfactant that may be present, a single surfactant or multiple surfactants can be used, such as sodium dodecyl sulfate, dioctyl sulfosuccinate sodium salt, and the like. In some examples, the food contact compliant surfactant is sodium dodecyl sulfate, dioctyl sulfosuccinate sodium salt. Tween 20 (or polyoxyethylene sorbitan monolaurate), isethionic acid sodium salt, sodium cocoyl isethionate, KOLLIPHOR® EL from BASF Corp. (Germany), or combinations thereof.

Although the food contact compliant surfactant used in the fluid agents described herein can include sodium dodecyl sulfate in some examples, in other examples the fluid agents can be devoid of sodium dodecyl sulfate. In particular, in some examples the food contact compliant fusing agent can be devoid of sodium dodecyl sulfate. This ingredient has been found, unexpectedly, to cause precipitation of solids in the fusing agent, which can interfere with the jettability of the fusing agent. In some examples, the food contact compliant fusing agent can include a carbon black dispersion, but can be devoid of sodium dodecyl sulfate so that this precipitation does not occur. In certain examples, the food contact compliant fusing agent can include dioctyl sulfosuccinate sodium salt exclusively as a surfactant.

In some examples, food contact compliant surfactants can include silicone surfactants. The food contact compliant silicone surfactants can include siloxanes and can be alkoxylated, polyester modified, polyether modified, polyether modified hydroxy functional, amine modified, epoxy modified and other modifications or combinations thereof. In some examples, the food contact compliant siloxanes are polymeric, for example polydimethylsiloxanes.

The amount of food contact compliant surfactant added to the food contact compliant fusing agent may range from about 0.01 wt % to about 10 wt %. In other examples, the amount of food contact compliant surfactant in the food contact compliant fusing agent can be from about 0.1 wt % to about 5 wt %, or the amount of food contact compliant surfactant in the food contact compliant fusing agent can be from about 0.5 wt % to about 4.5 wt %, or the amount of food contact compliant surfactant in the food contact compliant fusing agent can be from about 1 wt % to about 4 wt %, or the amount of food contact compliant surfactant in the food contact compliant fusing agent can be from about 1.5 wt % to about 3 wt %. In further examples, the amount of food contact compliant surfactant in the food contact compliant fusing agent can be from 0.05 wt % to 0.5 wt % or from 0.1 wt % to 0.2 wt %

Further, food contact compliant non-ionic, cationic, and/or anionic surfactants can be present in the food contact compliant fusing agent and/or the food contact compliant detailing agent, ranging from about 0.01 wt % to about 10 wt %.

In some examples, the food contact compliant liquid vehicle can also include food contact compliant dispersants in an amount of from about 0.1 wt % to about 10 wt %, or the food contact compliant liquid vehicle can also include food contact compliant dispersants in an amount of from about 1 wt % to about 8 wt %, or the food contact compliant liquid vehicle can also include food contact compliant dispersants in an amount of from about 2 wt % to about 6 wt %, or the ood contact compliant liquid vehicle can also include food contact compliant dispersants in an amount of less than about 5 wt %.

The balance of the food contact compliant fusing agent formulation can be purified water, and/or other vehicle components such as food contact compliant biocides, food contact compliant viscosity modifiers, food contact compliant materials for pH adjustment, food contact compliant sequestering agents, food contact compliant preservatives, and the like. In one example, the food contact compliant liquid vehicle can be predominantly water, e.g., more than about 70 wt % water, or more than about 75 wt % water, or more than about 80 wt % water, or more than about 85 wt % water.

Food Contact Compliant pH Adjusters and Food Contact Compliant Liquid Additives

In some examples, the food contact compliant fusing agent and/or the food contact compliant detailing agent can include a food contact compliant pH adjuster and/or a food contact compliant liquid additive. However, in a particular example, the food contact compliant fusing agent can be devoid of pH adjusters. In another particular example, the food contact compliant detailing agent can include a basic pH adjuster.

In some examples, the food contact compliant pH adjuster can include taurine, glycine, sodium bicarbonate, sodium dihydrogen orthophosphate, mono-sodium phosphate, di-sodium phosphate, tribasic-sodium phosphate, or mixtures thereof. In some examples, the food contact compliant pH adjuster can be added to the food contact compliant fusing agent and/or detailing agent in an amount of about 0.01 wt % to about 3 wt % based on the total weight of the agent.

In some examples, the food contact compliant liquid additive can include 2-phenoxyethanol, 2-phenylethanol, potassium sorbate, sodium benzoate, methylparaben, propylparaben, or mixtures thereof. In some examples, the food contact compliant liquid additive can be added to the food contact compliant fusing agent and/or detailing agent in an amount of about 0.01 wt % to about 3 wt % based on the total weight of the agent. In certain examples, the food contact compliant fusing agent and the food contact compliant detailing agent can include 2-phenoxyethanol. In further examples, the 2-phenoxyethanol can be included in an amount from about 0.2 wt % to about 2 wt % or from about 0.8 wt % to about 1.5 wt %.

While the mechanism of action of the liquid additive in the food contact compliant fusing and/or detailing agents is unclear, it is believed that the liquid additive can have a stabilizing effect on the agent compositions.

Food Contact Compliant Other Additive(s) Examples

In some examples, various other food contact compliant additives can be employed to adjust certain properties of the fluid compositions for specific applications. Examples of these food contact compliant additives include those added to inhibit the growth of harmful microorganisms. These food contact compliant additives may be preservatives, biocides, fungicides, and other microbial agents, which can be used in various formulations.

The food contact compliant biocide can be present in the food contact compliant fusing agent in an amount of from about 0.01 wt % to about 1 wt %. In more specific examples, the food contact compliant biocide can be present in an amount of from about 0.1 wt % to about 0.5 wt %.

In some examples, food contact compliant sequestering agents, such as EDTA (ethylene diamine tetra acetic acid), may be included to eliminate the deleterious effects of any heavy metal impurities, and food contact compliant buffer solutions may be used to control the pH of the fluid. From about 0.01 wt % to about 2 wt % of sequestering agents and/or buffer solutions can be added.

In some examples, a food contact compliant chelating compound can also be included. In certain examples, the food contact compliant detailing agent can include a food contact compliant chelating compound. In a particular example, the food contact compliant chelating compound can be disodium ethylenediaminetetraacetate dihydrate. In some examples, a food contact compliant chelating compound can be included in an amount from about 0.01 wt % to about 1 wt %.

In some examples, food contact compliant viscosity modifiers may also be present, as well as other additives to modify properties of the fluid as desired. Such additives can be present in an amount of from about 0.01 wt % to about 10 wt %.

In some examples, food contact compliant anti-kogation compounds can be added to the food contact compliant fusing agent to reduce build-up of residues on the resistor element in a thermal fluid jet system used to print the food contact compliant fusing agent. In some examples, the food contact compliant anti-kogation compound can include phosphate esters, polyelectrolyte polymers, and inorganic phosphate buffers. Suitable food contact compliant anti-kogation compounds can also be added. Food contact compliant sequestering and/or chelating compounds can also be used for anti-kogation. In certain examples, the food contact compliant anti-kogation compounds can be included in the food contact compliant fusing agent in an amount from about 0.01 wt % to about 1 wt %. In other examples, the total amount of food contact compliant anti-kogation compounds in the food contact compliant fusing agent can be from about 0.2 wt % to about 0.6 wt % or from about 0.4 wt % to about 0.5 wt %.

In some examples, the food contact compliant fusing agent further includes a food contact compliant wetting compound and a food contact compliant surfactant. In some examples, the food contact compliant fusing agent further includes a food contact compliant dispersant.

In further examples, the food contact compliant fusing agent can be formulated for use at elevated temperatures, such as temperatures from 50° C. to 95° C. In other examples, the food contact compliant fusing agent can be formulated for use at temperatures from 70° C. to 85° C. Because the three-dimensional printing processes described herein can involve heating polymer powder to fuse the polymer powder, the food contact compliant fusing agent can often be exposed to elevated temperatures. In some cases, the food contact compliant fusing agent can be contained in a reservoir that is positioned near the powder bed. Thus, the food contact compliant fusing agent can be formulated to be stable and jettable within the above temperature ranges. Moreover, the food contact compliant fusing agent can be exposed to even higher temperatures after being printed onto the powder bed. The powder bed can often be preheated to a preheat temperature such as 140° C. to 160° C., and the temperature of the powder bed during fusing can reach temperatures even as high as 220° C. Therefore, the food contact compliant fusing agent can be formulated to be safe and effective when used at these high temperatures. In one example, the food contact compliant fusing agent can be substantially devoid of flammable co-solvents or other ingredients that would create a fire risk at the temperatures employed in the three-dimensional printing process. For example, the food contact compliant fusing agent can be devoid of co-solvents or other ingredients with an autoignition temperature below 220° C.

Food Contact Compliant Detailing Agent Examples

As mentioned above, the kits and compositions according to the presently disclosed technology can also include a food contact compliant detailing agent. The food contact compliant detailing agent can be formulated for use in the same systems as the food contact compliant fusing agent described above. For example, the food contact compliant detailing agent and the food contact compliant fusing agent can be formulated for printing from a fluid jet printhead. Thus, the food contact compliant detailing agent can include any of the various food contact compliant ingredients and food contact compliant additives described above with respect to the food contact compliant fusing agent. However, the food contact compliant detailing agent can be devoid of the carbon black pigment used as an energy absorber in the food contact compliant fusing agent.

In some examples, the food contact compliant detailing agent can be formulated to provide a cooling effect on portions of the thermoplastic polymer powder bed onto which the food contact compliant detailing agent is applied. This cooling effect can be achieved, for example, by evaporation of water and/or co-solvents in the food contact compliant detailing agent. While the food contact compliant fusing agent can also produce an initial cooling effect due to evaporation of water and co-solvents in the food contact compliant fusing agent, the food contact compliant fusing agent can produce a net heating effect due to the energy absorber present in the food contact compliant fusing agent. The food contact compliant detailing agent can be devoid of the energy absorber used in the food contact compliant fusing agent, and therefore the food contact compliant detailing agent can have a net cooling effect. When the food contact compliant detailing agent is printed onto the powder bed around the edges of the portion printed with the food contact compliant fusing agent, the respective cooling and heating effects of the food contact compliant detailing agent and the food contact compliant fusing agent, respectively, can produce a sharp boundary between the fused portion and the unfused portions of the powder bed. Without the food contact compliant detailing agent, in some cases thermal bleed from the fused portion can result in partial fusing of the thermoplastic polymer powder around the edges of the fused portion. This can result in caking of the particles around the finished three-dimensional printed part and low part quality.

As mentioned above, in some examples the food contact compliant detailing agent can be devoid of carbon black pigment and other energy absorbers. However, it should be noted that most if not all materials absorb some amount of electromagnetic energy and convert the energy to heat. Therefore, as used herein, "devoid of energy absorbers" does not imply that the detailing agent is devoid of any ingredients that can absorb electromagnetic energy in any amount. Rather, the food contact compliant detailing agent can be devoid of the specific energy absorbers disclosed as being included in the food contact compliant fusing agent for the purpose of absorbing electromagnetic energy.

The food contact compliant detailing agent can include food contact compliant co-solvents of the same types described above with respect to the food contact compliant fusing agent. In a particular example, the food contact compliant detailing agent can include propylene glycol, glycerol, polyethylene glycol, or combinations thereof, as co-solvents.

The food contact compliant co-solvent can be included in an amount of from about 2 wt % to about 24 wt % with respect to the total weight of the food contact compliant detailing agent. In other examples, the food contact compliant co-solvent can be included in an amount from about 16 wt % to about 24 wt % with respect to the total weight of the food contact compliant detailing agent.

Thermoplastic Polymer Powder(s) Examples

In some examples, the kits and compositions can include a thermoplastic polymer powder. The thermoplastic polymer powder can have an average particle size from 10 microns to 100 microns. As used herein, "average" with respect to properties of particles refers to a number average unless otherwise specified. Accordingly, "average particle size" refers to a number average particle size. Additionally, "particle size" refers to the diameter of spherical particles, or to the longest dimension of non-spherical particles. In further detail, and in accordance with certain specific examples, the particle size distribution of the thermoplastic polymer powder can be as follows: D50 can be from 45 microns to 75 microns, from 55 microns to 65 microns, or about 60 μm; D10 can be from 10 microns to 50 microns, from 30 microns to 40 microns, or about 35 microns; and D90 can be from 75 microns to 150 microns, from 80 microns to 95 microns, or about 90 microns. "D50" is defined as the median weight. "D10" is defined as the tenth-percentile by weight of powder that is below a given particle size, e.g., from 20 microns to 50 microns. "D90" is defined as the ninetieth-percentile by weight of powder that is below a given particle-size, e.g., 75 microns to 100 microns.

In certain examples, the thermoplastic polymer powder can have a variety of shapes, such as substantially spherical particles or irregularly-shaped particles. In a particular example, the thermoplastic polymer powder can have a sphericity of 0.7 or greater. As used herein, "sphericity" refers to a ratio of the surface area of a sphere having the same volume as a particle to the actual surface area of the particle. Additionally, in some examples the thermoplastic polymer powder can have a BET surface area of less than 15 $m^2/g$.

In some examples, the polymer powder can be capable of being formed into three-dimensional printed parts with a resolution of 10 to 200 microns. As used herein, "resolution" refers to the size of the smallest feature that can be formed on a three-dimensional printed part. The polymer powder can form layers from about 10 to about 200 microns thick, allowing the fused layers of the printed part to have roughly the same thickness. This can provide a resolution in the z-axis direction of about 10 to about 200 microns. The polymer 2.5 powder can also have a sufficiently small particle size and sufficiently regular particle shape to provide about 10 microns to about 200 microns resolution along the x-axis and y-axis.

In some examples, the thermoplastic polymer powder can be colorless. For example, the polymer powder can have a white, translucent, or transparent appearance.

The thermoplastic polymer powder can have a fusing temperature from about 70° C. to about 350° C. In further examples, the polymer can have a fusing temperature from about 150° C. to about 200° C. As used herein, "fusing temperature" refers to the lowest temperature at which particles of the thermoplastic polymer powder fuse together to form a solid object. In some cases, this temperature can be referred to as a melting temperature, softening temperature, or flow temperature. Not all thermoplastic polymers have a specific melting temperature, as some polymers experience a gradual reduction in viscosity with increasing temperature. With such polymers, the particles can begin to flow sufficiently to fuse with neighboring polymer particles at the fusing temperature.

In some examples, the thermoplastic polymer powder can be polyamide-6 powder, polyamide-9 powder, polyamide-11 powder, polyamide-12 powder, polyamide-66 powder, polyamide-612 powder, polyethylene powder, thermoplastic polyurethane powder, thermoplastic polyamide powder, polypropylene powder, polyester powder, polycarbonate powder, polyether ketone powder, polyacrylate powder, polystyrene powder, polyvinylidene fluoride powder or a combination thereof.

In a specific example, the polymer powder can be a polyamide powder such as polyamide-11 or polyamide-12, which can have a melting point from about 180° C. to about 200° C. In some examples, the polyamide powder can be a semi-crystalline powder having a degree of crystallinity from 10% to 90%, which can be measured using differential scanning calorimetry. The polyamide powder can have a recrystallization temperature from 130° C. to 160° C. Additionally, the polyamide powder can have an enthalpy of fusion from 80 J/g to 130 J/g.

In further examples, the polyamide powder can have a number average molecular weight Mn from 10,000 to 500,000 and a polydispersity index (defined as Mw/Mn) from 1 to 5. Additionally, the molecular weight of polyamide powder can be characterized using solution viscosity as a proxy for molecular weight. "Solution viscosity" is defined by combining about 0.5 wt % polyamide-12 powder with about 99.5 wt % M-cresol and measuring the viscosity of the admixture. Further details for determining solution viscosity under this measurement protocol are described in International Standard ISO 307, Fifth Edition, 2007 May 15. In some examples, the polyamide powder used in the three-dimensional printing kits of the presently disclosed technology can have a solution viscosity from about 1.4 to about 2.0.

The thermoplastic polymer powder can also in some cases be blended with a filler. The filler can include inorganic particles such as alumina, silica, glass particles, metal particles, or ceramic particles, e.g. glass beads, steel balls, or metal grains, or other pigments, e.g. transition metal oxides, or combinations thereof. When the thermoplastic polymer powder fuses together, the filler particles can become embedded in the polymer, forming a composite material. In some examples, the filler can include a free-flow agent, anti-caking agent, or the like. Such agents can prevent packing of the powder particles, coat the powder particles and smooth edges to reduce inter-particle friction, and/or absorb moisture. In some examples, a weight ratio of thermoplastic polymer powder to filler particles can be from about 99.9:0.1 to about 1:2, from about 99:1 to about 1:1, or from about 5:1 to about 1:1. The filler particles can have a variety of particle sizes depending on the type of filler material. In some examples, the filler particles can have an average particle size from about 5 nm to about 200 microns, from about 10 nm to about 150 microns, or from about 100 nm to about 100 microns.

Food Contact Compliant Three-Dimensional Printing System Examples

Figure 3:
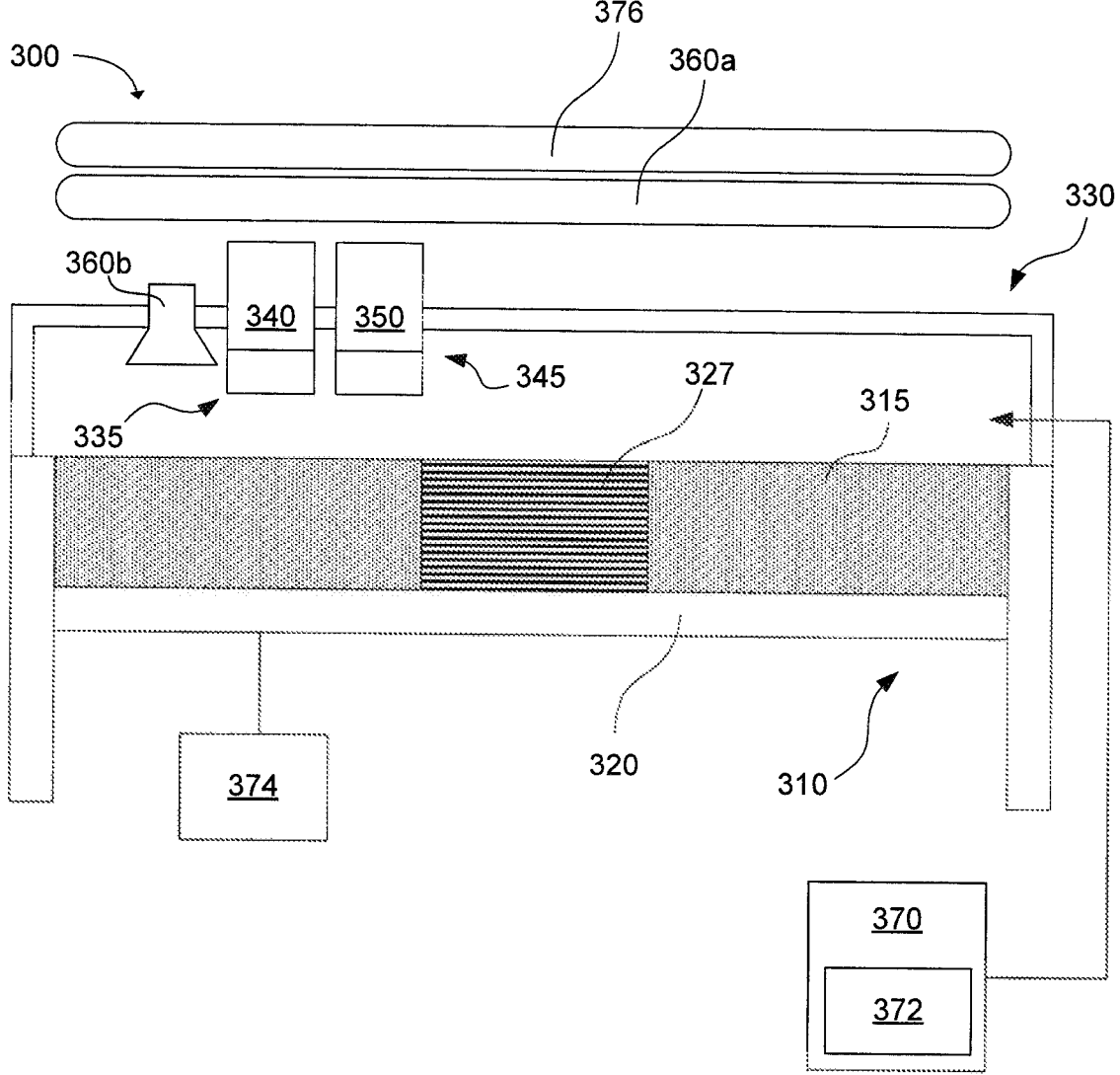
FIG. 3 is a schematic view of a three-dimensional printing system in accordance with examples of the present disclosure.

In addition to the kits and compositions described above, the present technology also encompasses three-dimensional printing systems that include the kits and compositions discussed hereinabove. An example of a three-dimensional printing system is shown in FIG. 3. The system 300 includes a powder bed 310 including a powder bed material 315, which includes the thermoplastic polymer powder described herein and has an average particle size from about 10 microns to about 200 microns. In the example shown, the powder bed has a build platform or moveable floor 320 that allows the powder bed to be lowered after the individual layers of the three-dimensional part are printed. The three-dimensional part 327 is shown after printing the food contact compliant fusing agent 340 on the powder bed material. The system also includes a fluid jet printer 330 that includes a first fluid ejector 335 in communication with a reservoir of the fusing agent 340. The first fluid ejector can be configured to print the food contact compliant fusing agent onto the powder bed. A second fluid ejector 345 is in communication with a reservoir of a food contact compliant detailing agent 350. The second fluid ejector can be configured to print the food contact compliant detailing agent onto the powder bed. In some examples, the three-dimensional printing system can also include additional fluid ejectors in communication with a reservoir of fluid to provide other colors and/or functionality.

After the food contact compliant fusing agent 340 has been printed onto the powder bed material 315, a fusing radiation source, such as a fusing lamp 360a or 360b, can be used to expose the powder bed to electromagnetic radiation sufficient to fuse the powder that has been printed with the food contact compliant fusing agents. Fusing lamp 360a may be a stationary fusing lamp that rests above the powder bed, and fusing lamp 360b may be carried on a carriage with the fluid ejectors 335, 345. To print the next layer, the moveable floor is lowered and a new layer of powder bed material is added above the previous layer. Unused powder bed material, such as that shown at 315, is not used to form the three-dimensional part, and thus, can be recycled for future use. Recycling can include refreshing the used powder bed material with a relatively small percentage of fresh powder bed material, e.g., as little as up to about 20 wt %, up to about 10 wt %, or up to about 5 wt %.

To achieve good selectivity between the fused and unfused portions of the powder bed, the food contact compliant fusing agents can absorb enough electromagnetic radiation or energy to boost the temperature of the thermoplastic polymer powder above the melting or softening point of the polymer, while unprinted portions of the powder bed remain below the melting or softening point. Thus, as mentioned, the three-dimensional printing system can include preheaters for preheating the powder bed material to a temperature near the melting or softening point. In one example, the system can include a preheater(s) to heat the powder bed material prior to printing. For example, the system may include a print bed heater 374 to heat the print bed to a temperature from about 100° C. to about 160° C., or from about 120° C. to about 150° C. The system can also include a supply bed or container 370 which also includes a supply heater 372 at a location where polymer particles may be stored before being spread in a layer onto the powder bed 310. The supply bed or container can utilize the supply heater to heat the supply bed or container to a temperature from about 90° C. to about 140° C. Thus, when an overhead heating source 376, e.g., heating lamps, may be used to heat up the powder bed material to a printing temperature, the typical minimum increase in temperature for printing can be carried out quickly, e.g., up to about 160° C. to about 220° C. To be clear, the overhead heating source used to heat the powder bed material for printing is typically a different energy source than the electromagnetic radiation source, e.g., fusing lamp 360a or 360b, used to thermally activate the energy absorber, though these energy sources could be the same depending on the energy absorber and powder bed material chosen for use.

Suitable fusing radiation sources or fusing lamps for use in the three-dimensional printing system can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure needed to fuse the individual printed layer. The fusing lamp can be configured to irradiate the entire powder bed with a substantially uniform amount of energy. This can selectively fuse the printed portions with fusing agents leaving the unprinted portions of the powder bed material below the fusing temperature of the polymer powder.

Depending on the amount of energy absorber present in the polymer powder, the absorbance of the energy absorber, the preheat temperature, and the fusing temperature of the polymer powder, an appropriate amount of irradiation can be supplied from the fusing radiation source or lamp. In some examples, the fusing lamp can irradiate individual layers from about 0.5 to about 10 seconds per pass.

EXAMPLES

The following illustrates examples of the present disclosure. However, it is to be understood that the following is illustrative of the application of the principles of the present disclosure. Numerous modifications and alternative compositions, methods, and systems may be devised without departing from the spirit and scope of the present disclosure. The appended claims are intended to cover such modifications and arrangements.

Example 1

Two example food contact compliant fusing agents (FA1 and FA2) were prepared from the ingredients shown in Table 2 below.

TABLE 2

| Example Food Contact Compliant Fusing Agents | | | |
|---|---|---|---|
| Component | % active | FA1 wt % | FA2 wt % |
| Food contact compliant carbon black dispersion | 15.5 | 1-10 | 1-10 |
| Glycerol | 100 | 2-20 | 2-20 |
| Polyethylene Glycol 300 | 100 | 1-10 | 1-10 |
| Sodium dodecyl sulfate | 100 | 0.1-0.5 | — |
| Dioctyl sulfosuccinate sodium salt | 100 | 0.05-0.2 | 0.1-0.3 |
| 2-phenoxyethanol | 100 | 0.1-0.3 | 0.8-1.5 |
| Taurine | 100 | 0.01-0.1 | — |
| Deionized water | 100 | balance | balance |

The example fusing agent FA1 was unexpectedly found to have precipitation of a solid precipitate. FA2 was formulated without sodium dodecyl sulfate, and had a greater amount of dioctyl sulfosuccinate sodium salt. The precipitation did not occur in FA2.

Example 2

An example food contact compliant detailing agent (DA) and a comparative food contact compliant detailing agent (DAC) were prepared from the ingredients shown in Table 3 below.

TABLE 3

| Food Contact Compliant Detailing Agents | | | |
|---|---|---|---|
| Component | % active | DA wt % | DAC wt % |
| Polyethylene Glycol 300 | 100 | — | 2-20 |
| Glycerol | 100 | 2-20 | — |
| Propylene Glycol | 100 | 2-20 | — |
| Sodium bicarbonate | 100 | 0.01-0.05 | 0.02-0.1 |
| EDTA-disodium salt | 100 | 0.01-0.05 | — |
| 2-phenoxyethanol | 100 | 0.8-1.5 | 0.1-0.3 |
| Dioctyl sulfosuccinate sodium salt | 100 | 0.1-0.3 | 0.1-0.3 |
| Deionized water | 100 | balance | balance |

The comparative food contact compliant detailing agent was unexpectedly discovered to have low printhead compatibility. An accelerated offline printhead compatibility test was performed with the DA and DAC formulations. In this test, rubber components from a production printhead were immersed in the DA and DAC formulations for 2 weeks at 70° C. The agents were then filtered. Solid crystals were found in the DAC formulation. The same crystals had previously been found to accumulate in print nozzles after extensive 3D printing, which negatively impacts nozzle health. For example, microscope images of the detailing agent printheads showed significant puddling of the DAC composition in the printheads. The DA composition did not show any puddling. The formation of the crystals was unexpected because the ingredients in the DAC formulation were considered to be mild. Adding the chelating compound EDTA—disodium salt appears to prevent the formation of the solid crystals.

Example 3

Several properties of the formulations FA1, FA2, DA, and DAC were measured over a time period of 6 weeks for the fusing agents and 4 weeks for the detailing agents. The measured property values are shown in Tables 4-7 below.

TABLE 4

| FA1 Properties | | | | | |
|---|---|---|---|---|---|
| Time | Week 0 | Week 1 | Week 2 | Week 4 | Week 6 |
| Viscosity (cP) | 2.7 | 2.7 | 2.7 | 2.7 | 2.7 |
| pH | 9.67 | 9.33 | 9.19 | 9.07 | 8.98 |
| Surface Tension | 33.86 | 36.45 | 37.91 | 39.06 | 39.67 |

TABLE 5

| FA2 Properties | | | | | |
|---|---|---|---|---|---|
| Time | Week 0 | Week 1 | Week 2 | Week 4 | Week 6 |
| Viscosity (cP) | 2.8 | N/A | 2.7 | 2.7 | 2.7 |
| pH | 9.95 | 9.42 | 9.28 | 9.11 | 9.06 |
| Surface Tension | 33.40 | 41.13 | 44.50 | 46.15 | 46.15 |

TABLE 6

| DA Properties | | | | |
|---|---|---|---|---|
| Time | Week 0 | Week 1 | Week 2 | Week 4 |
| Viscosity (cP) | 1.6 | 1.6 | 1.6 | 1.6 |
| pH | 8.17 | 7.49 | 7.78 | 7.60 |

TABLE 6-continued

| DA Properties | | | | |
|---|---|---|---|---|
| Time | Week 0 | Week 1 | Week 2 | Week 4 |
| Surface Tension | 31.64 | 31.15 | 31.10 | 31.47 |
| Conductivity (mS) | 0.365 | 0.365 | 0.368 | 0.369 |

TABLE 7

| DAC Properties | | | | |
|---|---|---|---|---|
| Time | Week 0 | Week 1 | Week 2 | Week 4 |
| Viscosity (cP) | 1.5 | 1.5 | 1.5 | 1.5 |
| pH | 8.55 | 8.30 | 8.39 | 8.38 |
| Surface Tension | 30.96 | 31.35 | 32.15 | 34.86 |
| Conductivity (mS) | 0.524 | 0.523 | 0.526 | 0.532 |

The property data shows an increase in surface tension of the FA2 fusing agent. However, this does not appear to affect print performance. The DA formulation had a reduced pH and a more stable surface tension compared to the DAC formulation.

Example 4

The FA1, FA2, DA, and DAC formulations were used in a three-dimensional printing system to print three-dimensional test objects. The number of nozzle defects were counted at multiple points after certain numbers of layers of the three-dimensional objects had been printed. The test was repeated with multiple three-dimensional test objects. It was found that nozzle health decreased over time as layers were printed with the DAC composition and with the FA1 composition. However, the nozzles used to print the DA composition and the FA2 composition had better nozzle health and the nozzle health remained steadier over time as layers were printed.

Definitions

It is noted that, as used in this specification and the appended claims, the singular forms "a," "an," and "the" include plural referents unless the context clearly dictates otherwise.

As used herein, "liquid vehicle" refers to a liquid in which additives may be placed to form fluid jettable formulations, such as fusing agent, detailing agents, inks, functional fluids, etc. A wide variety of liquid vehicles may be used in accordance with the technology of the present disclosure. Such liquid or ink vehicles may include a mixture of a variety of different agents, including, surfactants, solvents, co-solvents, anti-kogation agents, buffers, biocides, sequestering agents, viscosity modifiers, surface-active agents, water, etc.

The term "fluid" herein does not exclude solid additives that may be suspended therein, as fluid can include both solutions and fine dispersions, such as in fusing agents, detailing agents, inks, functional fluids, etc.

As used herein, "dye" refers to compounds or molecules that absorb electromagnetic radiation or certain wavelengths thereof. Dyes can impart a visible color to an ink if the dyes absorb wavelengths in the visible spectrum.

As used herein, "pigment" includes pigment colorants, magnetic particles, aluminas, silicas, and/or other ceramics, organo-metallics or other opaque particles, whether or not such particulates impart color. Thus, though the present description describes the use of pigment colorants, the term "pigment" can be used to describe pigment colorants, and also other pigments such as organometallics, ferrites, ceramics, etc. In one specific aspect, however, the pigment is a pigment colorant.

As used herein, "soluble," refers to a solubility percentage of more than 5 wt %.

As used herein, "fluid jetting" or "jetting" refers to compositions that may be ejected from jetting architecture, such as inkjet architecture or fluid jet architecture, e.g., thermal or piezo architecture. Additionally, such architecture can be configured to print varying drop sizes such as less than 10 picoliters, less than 20 picoliters, less than 30 picoliters, less than 40 picoliters, less than 50 picoliters, etc.

The term "thermoplastic polymer powder" refers to relatively fine thermoplastic particles with an average particle size from 10 µm to 200 µm. The thermoplastic polymer powder can have a melting or softening point from about 70° C. to about 350° C., and can include polymers such as nylons or polyamides, polyethylenes, thermoplastic polyurethanes, polypropylenes, polyesters, polycarbonates, polyether ketones, polyacrylates, polystyrenes, etc. The term "powder" can be used interchangeably with "particle" or "particulate."

As used herein, the term "food contact compliant" is meant to include components and/or materials that are considered compliant under EU and/or US regulations for use in various food contact applications. These "food contact compliant" components and/or materials described herein are meant to be used for applications such as food contact compliant materials (e.g., food packaging), cosmetic contact compliant materials (e.g., cosmetic packaging or products such as mascara wands), and other regulated consumer applications.

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein. In some examples, "a little above" or "a little below" mean less than 5%.

As used herein, a plurality of items, structural elements, compositional elements, and/or materials may be presented in a common list for convenience. However, these lists should be construed as though individual members of the list are individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include the numerical values explicitly recited as the limits of the range, and also to include individual numerical values or sub-ranges encompassed within that range as if the numerical values and sub-ranges are explicitly recited. As an illustration, a numerical range of "about 1 wt % to about 5 wt %" should be interpreted to include the explicitly recited values of about 1 wt % to about 5 wt %, and also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

What is claimed is:

1. A multi-fluid kit of food contact compliant agents for three-dimensional printing, the multi-fluid kit comprising:
   a food contact compliant fusing agent that is jettable from a fluid jet printer, the food contact compliant fusing agent comprising:
      from about 70 wt % to about 96 wt % of water based on the total weight of the food contact compliant fusing agent;
      a food contact compliant carbon black dispersion present in an amount of from about 3 wt % to about 10 wt % by solids weight of the carbon black dispersion out of the total weight of the food contact compliant fusing agent;
      from 0.1 wt % to 0.3 wt % of dioctyl sulfosuccinate sodium salt;
      a food contact compliant water-soluble first co-solvent present in the food contact compliant fusing agent in an amount of from about 1 wt % to about 25 wt % based on the total weight of the food contact compliant fusing agent, wherein the food contact compliant water-soluble first co-solvent comprises glycerol and polyethylene glycol; and
      2-phenoxyethanol,
      wherein the food contact compliant fusing agent is devoid of sodium dodecyl sulfate; and
   a food contact compliant detailing agent comprising:
      from about 75 wt % to about 99 wt % of water based on the total weight of the food contact compliant detailing agent;
      a food contact compliant chelating compound present in an amount of from about 0.01 wt % to about 1 wt % based on the total weight of the food contact compliant detailing agent; and
      2-phenoxyethanol.

2. The multi-fluid kit of claim 1, wherein the food contact compliant detailing agent further comprises a food contact compliant water-soluble second co-solvent present in an amount of from about 2 wt % to about 24 wt % based on the total weight of the food contact compliant detailing agent, wherein the food contact compliant water-soluble second co-solvent comprises glycerol and propylene glycol.

3. The multi-fluid kit of claim 1, wherein:
   the 2-phenoxyethanol is present in the food contact compliant fusing agent in an amount of from about 0.2 wt % to about 1 wt % based on the total weight of the food contact compliant fusing agent; and
   the 2-phenoxyethanol is present in the food contact compliant detailing agent in an amount of from about 0.2 wt % to about 1 wt % based on the total weight of the food contact compliant detailing agent.

4. The multi-fluid kit of claim 1, wherein the food contact compliant detailing agent comprises from about 75 wt % to about 80 wt % of the water based on the total weight of the food contact compliant detailing agent.

5. The multi-fluid kit of claim 1, wherein the food contact compliant chelating compound of the food contact compliant detailing agent is disodium ethylenediaminetetraacetate dihydrate.

6. A three-dimensional printing kit, comprising:
   a food contact compliant fusing agent that is jettable from a fluid jet printer, the food contact compliant fusing agent comprising:
      from about 70 wt % to about 96 wt % of water based on the total weight of the food contact compliant fusing agent;
      a food contact compliant carbon black dispersion present in an amount of from about 3 wt % to about 10 wt % by solids weight of the carbon black dispersion out of the total weight of the food contact compliant fusing agent;
      from 0.1 wt % to 0.3 wt % of dioctyl sulfosuccinate sodium salt;
      a food contact compliant water-soluble first co-solvent present in the food contact compliant fusing agent in an amount of from about 1 wt % to about 25 wt % based on the total weight of the food contact compliant fusing agent, wherein the food contact compliant water-soluble first co-solvent comprises glycerol and polyethylene glycol; and
      2-phenoxyethanol,
      wherein the food contact compliant fusing agent is devoid of sodium dodecyl sulfate;
   a food contact compliant detailing agent comprising:
      from about 75 wt % to about 99 wt % of water based on the total weight of the food contact compliant detailing agent;
      a food contact compliant chelating compound present in an amount of from about 0.01 wt % to about 1 wt % based on the total weight of the food contact compliant detailing agent; and
      2-phenoxyethanol; and
   a thermoplastic polymer powder.

7. The three-dimensional printing kit of claim 6, wherein the thermoplastic polymer powder is selected from the group consisting of polyamide-6 powder, polyamide-9 powder, polyamide-11 powder, polyamide-12 powder, polyamide-66 powder, polyamide-612 powder, polyethylene powder, thermoplastic polyurethane powder, thermoplastic polyamide powder, polypropylene powder, polyester powder, polycarbonate powder, polyether ketone powder, polyacrylate powder, polystyrene powder, polyvinylidene fluoride powder, and a combination thereof.

8. The three-dimensional printing kit of claim 6, wherein the thermoplastic polymer powder has an average particle size of from about 10 microns to about 200 microns.

9. The three-dimensional printing kit of claim 6, wherein:
   the food contact compliant detailing agent comprises from about 75 wt % to about 80 wt % of the water based on the total weight of the food contact compliant detailing agent;
   the food contact compliant chelating compound is disodium ethylenediaminetetraacetate dihydrate; and
   the food contact compliant detailing agent further comprises a food contact compliant water-soluble second co-solvent present in an amount of from about 2 wt % to about 24 wt % based on the total weight of the food contact compliant detailing agent.

10. A three-dimensional printing system, comprising:
   a powder bed comprising a thermoplastic polymer powder;

a fluid jet printer, comprising:

a first fluid ejector in communication with a reservoir of a food contact compliant fusing agent to jet the food contact compliant fusing agent onto the powder bed, wherein the food contact compliant fusing agent comprises:

about 70 wt % to about 96 wt % of water based on the total weight of the food contact compliant fusing agent;

a food contact compliant carbon black dispersion present in an amount of from about 3 wt % to about 10 wt % based on the total weight of the food contact compliant fusing agent;

from 0.1 wt % to 0.3 wt % of dioctyl sulfosuccinate sodium salt;

a food contact compliant water-soluble first co-solvent present in the food contact compliant fusing agent in an amount of from about 1 wt % to about 25 wt % based on the total weight of the food contact compliant fusing agent, wherein the food contact compliant water-soluble first co-solvent comprises glycerol and polyethylene glycol; and 2-phenoxyethanol, wherein the food contact compliant fusing agent is devoid of sodium dodecyl sulfate; and a second fluid ejector in communication with a reservoir of a food contact compliant detailing agent to print the food contact compliant detailing agent onto the powder bed, wherein the food contact compliant detailing agent comprises:

from about 75 wt % to about 99 wt % of water based on the total weight of the food contact compliant detailing agent;

a food contact compliant chelating compound present in an amount of from about 0.01 wt % to about 1 wt % based on the total weight of the food contact compliant detailing agent; and 2-phenoxyethanol; and a fusing radiation source to expose the powder bed to electromagnetic radiation sufficient to fuse thermoplastic polymer powder that has been printed with the food contact compliant fusing agent.

11. The three-dimensional printing system of claim 10, wherein:

the food contact compliant detailing agent comprises from about 75 wt % to about 80 wt % of the water based on the total weight of the food contact compliant detailing agent;

the food contact compliant chelating compound is disodium ethylenediaminetetraacetate dihydrate; and the food contact compliant detailing agent further comprises a food contact compliant water-soluble second co-solvent present in an amount of from about 2 wt % to about 24 wt % based on the total weight of the food contact compliant detailing agent.

\* \* \* \* \*